US006175397B1

(12) United States Patent
Inoue et al.

(10) Patent No.: US 6,175,397 B1
(45) Date of Patent: Jan. 16, 2001

(54) LIQUID CRYSTAL DISPLAY APPARATUS, A LIQUID CRYSTAL PROJECTOR USING SAME, AND A METHOD OF MANUFACTURING THE LIQUID CRYSTAL DISPLAY APPARATUS

(75) Inventors: Shunsuke Inoue; Yasuhiro Sekine, both of Yokohama; Hiroshi Mizuno, Zama, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/038,473

(22) Filed: Mar. 9, 1998

(30) Foreign Application Priority Data

Mar. 10, 1997 (JP) .................................................... 9-054643

(51) Int. Cl.[7] ................................................ G02F 1/1333
(52) U.S. Cl. ............................................ 349/86; 349/88
(58) Field of Search ................................. 349/86, 88, 93, 349/149, 151, 137, 5

(56) References Cited

U.S. PATENT DOCUMENTS

| 5,595,620 |   | 1/1997  | Takei et al. ............................ 156/64 |
|-----------|---|---------|--------------------------------------------------|
| 5,691,794 | * | 11/1997 | Hoshi et al. .......................... 349/158  |
| 5,757,054 |   | 5/1998  | Miyawaki et al. .................... 257/390    |
| 5,757,448 | * | 5/1998  | Takei ..................................... 359/51 |
| 5,781,259 | * | 7/1998  | Shinomiya et al. .................... 349/88   |
| 5,793,454 | * | 8/1998  | Kawazu et al. ......................... 349/92  |
| 5,812,227 | * | 9/1998  | Toshida et al. ........................ 349/88  |
| 5,963,283 | * | 10/1999 | Omae et al. ............................. 349/86 |
| 6,014,194 | * | 1/2000  | Kuo et al. ............................... 349/88 |

FOREIGN PATENT DOCUMENTS

| 42 15 868   |   | 11/1993 | (DE) . |
|-------------|---|---------|--------|
| 703 485     |   | 3/1996  | (EP) . |
| 0703485 A2  | * | 3/1996  | (EP) . |
| 6-194629    |   | 7/1994  | (JP) . |
| 6-194630    |   | 7/1994  | (JP) . |

OTHER PUBLICATIONS

Sid International Symposium Digest of Technical Papers, Anaheim, May 6–10, 1991, vol. 22, May 6, 1991, pp. 602–605.

* cited by examiner

*Primary Examiner*—Kenneth Parker
*Assistant Examiner*—Mike Qi
(74) *Attorney, Agent, or Firm*—Fitzpatrick, Cella, Harper & Scinto

(57) ABSTRACT

A liquid crystal display apparatus comprises a first polymer-containing liquid crystal area forming a first area including a display area, and a second polymer-containing liquid crystal area including a second area other than the first area, and is characterized in that polymer of the first polymer-containing liquid crystal area and polymer of the second polymer-containing liquid crystal area respectively have network structures different from each other.

18 Claims, 7 Drawing Sheets

FIG. 8

LIQUID CRYSTAL DISPLAY APPARATUS, A LIQUID CRYSTAL PROJECTOR USING SAME, AND A METHOD OF MANUFACTURING THE LIQUID CRYSTAL DISPLAY APPARATUS

BACKGROUND OF THE INVENTION

1. Field of the Invention

The present invention relates to a liquid crystal display apparatus in which high polymer is mixed in liquid crystal, a liquid crystal projector using the liquid crystal apparatus, and a method of manufacturing the liquid crystal display apparatus.

2. Related Background Art

In recent years, liquid crystal display apparatuses have been widely used in various devices because of their advantages of thin sizes, low voltage driving ability, and saved power consumption, and the like, as is representatively known from a display of a direct view type having a diagonal size exceeding 10 inches. Also, liquid crystal projectors which realize display on a larger screen by providing a liquid crystal display panel together with an optical system have come to be introduced as practically useful commercial products having high resolution and brightness, as computers have spread popularly.

Liquid crystal used in those liquid crystal panels is generally TN (Twisted Nematic) liquid crystal which achieves higher response speed and contrast in comparison with STN (Super Twisted Nematic) liquid crystal used mainly in conventional panels, so that images of higher quality can be displayed.

However, in a display apparatus using TN liquid crystal, loss of light is largely due to a polarizing plate and the brightness is therefore limited. Particularly, the drawback of the TN liquid crystal display apparatus is remarkable in case of a projection type liquid crystal display apparatus which requires high brightness.

As countermeasures against the drawback, proposals have been made as to liquid crystal display apparatuses using various liquid crystal, such as "PNLC (Polymer Network Liquid Crystal)" in which TN liquid crystal is dispersed in a liquid crystal continuous phase or a sponge-like polymer network, a "high-polymer/liquid crystal composite film" capable of forming a display of a large screen by using an electro-optic effect accompanying light diffusion without using a polarizing plate, or "polymer dispersed liquid crystal" having a structure in which spherical liquid crystal grains are dispersed in a high-polymer matrix between transparent electrode and liquid crystal molecules are oriented along a wall surface of the high-polymer matrix within the grains in the following manner. Specifically, incident light is diffused when a difference exists between the average refractive index of the liquid crystal grains and the refractive index of the high-polymer matrix. As the refractive indexes is increased when a voltage is applied to the high-polymer dispersed cell, liquid crystal is released from restrictions from the wall surface of the high-polymer matrix, to be oriented to be vertical to the surfaces of the transparent electrodes. When the refractive index of the high-polymer matrix is close to the refractive index of the liquid crystal molecules in the short-axis direction of the molecules, incident light is transmitted without being dispersed.

The PNLC is provided as a type of liquid crystal in which light is transmitted at a high transmit rate by making the refractive index of TN liquid crystal be substantially equal to the refractive index of the polymer network when a voltage is applied, while incident light is diffused to produce black by a difference between the refractive index of the TN liquid crystal oriented randomly and the refractive index of the polymer network when no voltage is applied. A display apparatus using the PNLC does not use a polarizing plate, and therefore essentially realizes display with a higher light use efficiency, i.e., brighter display than a TN liquid crystal display apparatus. These phenomena and applications are common to the "high-polymer/liquid crystal composite film" and the "polymer dispersed liquid crystal".

In order to more advantageously use the high light use efficiency of the "polymer network liquid crystal" and the like, it is effective that the active matrix substrate is of a reflective type. Since a reflective type substrate can be embedded below a reflective electrode to shield light, the aperture can be increased to be close to 100%, resulting in a potential that the light use efficiency is not decreased unlike a transparent type even when the pixel size is reduced.

In case of manufacturing a liquid crystal display apparatus using "high-polymer/liquid crystal composite film", "polymer dispersed liquid crystal", or "polymer network liquid crystal" of a reflective type, an active element is embedded below a reflective electrode with respect to a reflective type substrate and high-polymer, and liquid crystal are injected and sealed between the substrate and a transparent electrode. Thereafter, ultraviolet light (UV) is irradiated thereon, and thus, a liquid crystal panel is prepared.

In particular, a method of manufacturing the (polymer dispersed liquid crystal" is described in Japanese Patent Laid-open Application No. 5-61016. According to this publication, an acrylate-based ultraviolet-polymerized composite material (using a light-polymerization starting agent of DAROQUA (phonetic translation) 1116 available from Merck & Co., Inc.) and a liquid crystal composite material (E8 available from BDH-SHA (phonetic translation)) are uniformly dissolved and injected into glass cell having an ITO electrode. Thereafter, ultraviolet light is irradiated thereon (at 1 mW for 500 seconds), thereby to prepare the polymer dispersed liquid crystal (PDLC) cell. The grain diameter of the liquid crystal composite material in the PDLC material is set to 0.1 to 10 $\mu$m which is adjusted by the content of the liquid crystal composite material. That is, a liquid crystal composite material of 65 to 75 weight % is used with respect to a total weight of the high-polymer matrix and the liquid crystal composite material, to mix samples having different grain diameters.

However, in case of a conventional liquid crystal panel using ultra-violet irradiation, it has been found that uneven display occurs. Particularly, in case of irradiating ultra-violet light of parallel light onto the entire surface of liquid crystal area, there appears a phenomenon that the reflection light amount decreases concentrically from the center portion of the liquid crystal panel to the peripheral portion thereof, i.e., the transmittance rate decreases. In case of a color three-plate type, irregular color appears concentrically. These drawbacks are caused by unevenness of the polymerization condition or unevenness of liquid crystal grain diameters, and are estimated to be due to a stress during polymerization. Another factor is estimated to be that an influence from a seal differs in accordance with a distance from the seal during polymerization.

In addition, it has been found that there is a problem concerning the stability of liquid crystal. That is, the liquid crystal phase lacks the stability because of an existence of a non-reactive liquid crystal phase exists during preparation using ultraviolet light.

Figure 5:
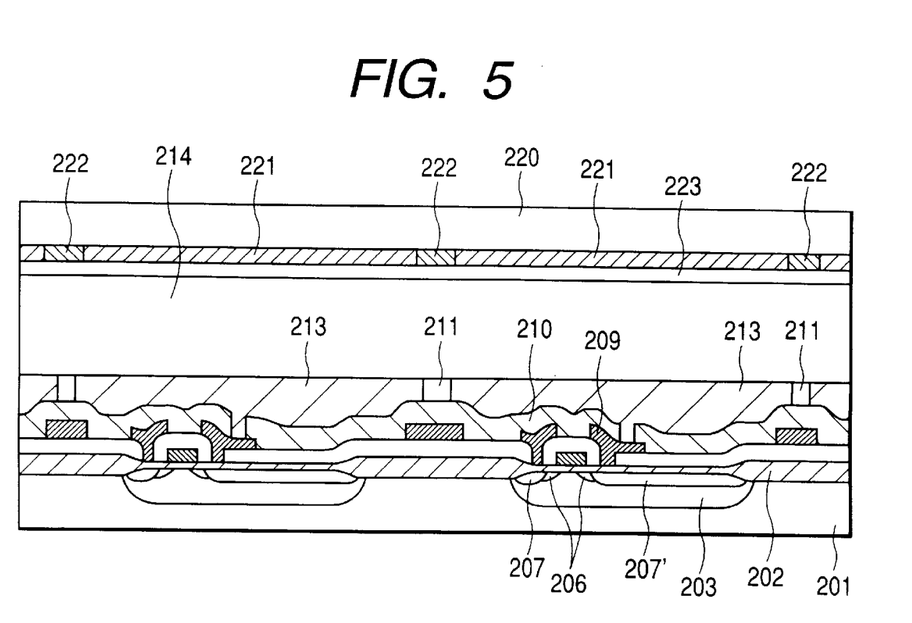
FIG. 5 is a schematic cross-sectional view showing an example of a liquid crystal display apparatus according to the present invention.

A liquid crystal display apparatus into which liquid crystal has been injected will be explained with reference to a cross-section shown in FIG. 5. The applicant filed Japanese Patent Application No. 7-186473 concerning a method of manufacturing an active matrix substrate. The active matrix substrate is constructed as follows. A lower portion of liquid crystal 214 is comprised of an n-type silicon semiconductor substrate 201 having an impurity density of $10^{15}$ cm$^{-3}$ or less, LOCOS 202, a PWL 203 as a p-type impurity region having an impurity density of about $10^{16}$ cm$^{-3}$, an NLD 206 as an n-type impurity region having an impurity density of about $10^{16}$ cm$^{-3}$, source and drain regions 207 and 207' having an impurity density of about $10^{19}$ cm$^{-3}$, an Al electrode 209, a PSG 211, an SiN 210, and a pixel electrode 213.

Next, an upper portion of the liquid crystal 214 is comprised of a transparent substrate 220, a color filter 221, a black matrix 222, and a common electrode consisting of an ITO or the like. However, the color filter 221 which does not transmit ultra-violet light and the black matrix 222 are not used to achieve the object of the present invention, and layers for these components are not required. This is because the active matrix substrate adopted in the present invention uses one sheet per color and the color filter of the present invention does not transmit ultra-violet light. Therefore, to achieve the object of the present invention, the upper portion of the liquid crystal 214 may have a structure comprised of a transparent substrate 220 made of glass or the like on which a transparent electrode is vapor-deposited on the side facing the liquid crystal 214 or a structure comprised of a common substrate 223 and a transparent substrate 220. Note that color filters and a black matrix must allow ultraviolet light to be transmitted to some extent, in case of adopting a liquid crystal display apparatus for a RGB matrix. In the active matrix substrate having a structure as described above, the surfaces of pixel electrodes 213 are flat and smooth, and insulating layers are embedded in clearances between adjacent pixel electrodes, resulting in an advantage in that the entire surface is not concave or convex but is flat and smooth.

Figure 6:
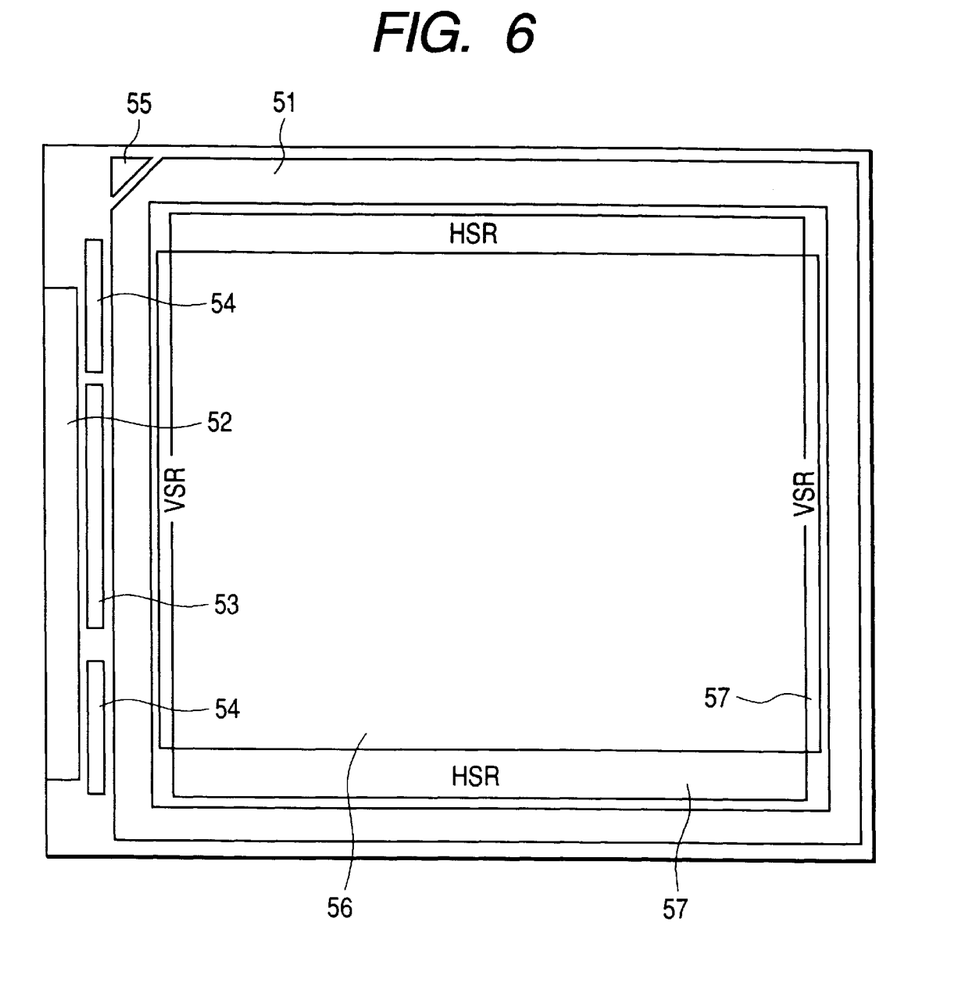
FIG. 6 is a schematic plan view showing an example of a liquid crystal display apparatus according to the present invention.

A plan view of the liquid crystal apparatus will be explained with reference to FIG. 6. This figure shows a relationship between a seal structure and a panel structure. References 51, 52, 53, and 54 respectively denote a seal portion, an electrode pad, a clock buffer circuit, and an amplifier. The amplifier 54 is used as an output amplifier for an electric inspection of a panel. References 55, 56, and 57 respectively denote an Ag paste portion for obtaining an electric potential of an opposite electrode, a display portion, and a peripheral circuit portion including, for example, vertical and horizontal shift registers (HST and VSR) and the like. As shown in FIG. 6, circuits are arranged to have a small total chip size both inside and outside the seal. Although leads from the pad are concentrated at one side of edges of the panel in this embodiment, leads can be extracted from both sides of longer edges of the panel or from sides of more edges thereof, resulting in an advantage when responding to a high-speed clock.

SUMMARY OF THE INVENTION

The present invention has been made as a result of making eager studies and experiments to solve the problem as described above, i.e., the problem concerning unevenness of display luminance and stability of liquid crystal.

According to the present invention, there is provided a liquid crystal display apparatus comprising: a first polymer-containing liquid crystal area forming a first area including a display area; and a second polymer-containing liquid crystal area including a second area other than the first area, characterized in that polymer of the first polymer-containing liquid crystal area and polymer of the second polymer-containing liquid crystal area respectively have network structures different from each other.

Further, according to the present invention, there is provided a method of manufacturing a liquid crystal display apparatus, comprising: a step of providing a liquid crystal material and a pre-polymer material between a pair of substrates at least one of which is transparent; and a step of irradiating the pre-polymer with light which causes the pre-polymer material to make a polymerization reaction, to polymerize the pre-polymer material, characterized in that first light irradiation is performed on a first area including a display area, and thereafter, second light irradiation is performed on the first area and a second area other than the first area.

Furthermore, according to the present invention, there is provided a liquid crystal projector for irradiating the above liquid crystal display apparatus with light from a light source, and for projecting reflection light from the liquid crystal display apparatus onto a screen, to display an image.

According to the liquid crystal display apparatus of the present invention, the second area serves as a stress absorbing area so that the polymer network in the first area including the display area is rendered uniform. As a result, display unevenness and luminance unevenness can be prevented.

In addition, according to the present invention, the second area serves as an absorbing layer for absorbing a force from the seal portion, which restricts orientation of liquid crystal, so that influences from the seal portion of the display area are less effected. As a result, unevenness of display luminance and color is greatly improved.

Further, according to the present invention, two-step light irradiation is carried out as first irradiation and second irradiation, so that all components mixed in liquid crystal are caused to make a reaction, thereby reducing instability of liquid crystal. As a result, reliability of the liquid crystal apparatus can be improved.

DETAILED DESCRIPTION OF THE PREFERRED EMBODIMENTS

The present invention has been made on the basis of knowledge that unevenness in display is reduced in a manner in which strong ultra-violet rays (which will be referred to only as ultra-violet rays or UV rays) are irradiated for a short time period onto a liquid crystal panel enclosing polymer and liquid crystal and provided with a seal frame including at least a display area and weak ultra-violet rays are thereafter irradiated onto the entire surface of the liquid crystal area.

When irradiating UV rays, a stress caused due to a polymerization reaction during irradiation of UV rays is released to the outside of a UV ray irradiation area, by irradiating UV rays onto only a display area (or an area including a display area). Therefore, the polymerization reaction (for forming polymer or a network) is performed uniformly within the irradiation area and is not directly influenced from the surface of a seal agent, so that unevenness of display characteristics is improved. Also, it has been found that the hysteresis and response speed of the display area can be improved by performing irradiation in two steps.

In addition, after irradiation of relatively strong UV rays in the first step which causes a polymerization reaction as described above, irradiation of relatively weak UV rays is performed in the second step so that a weak polymerization reaction is generated in areas onto which UV rays are not irradiated in the first step. Therefore, reliability is ensured, and the hysteresis and response speed of the display area are improved in comparison with a case of adopting no irradiation in the first step.

Depending on irradiation of UV rays, a small polymer network structure is formed in a UV-ray-irradiated area in the first step, and a large polymer network structure is formed in an area other than the UV-ray-irradiated area.

Figure 8:
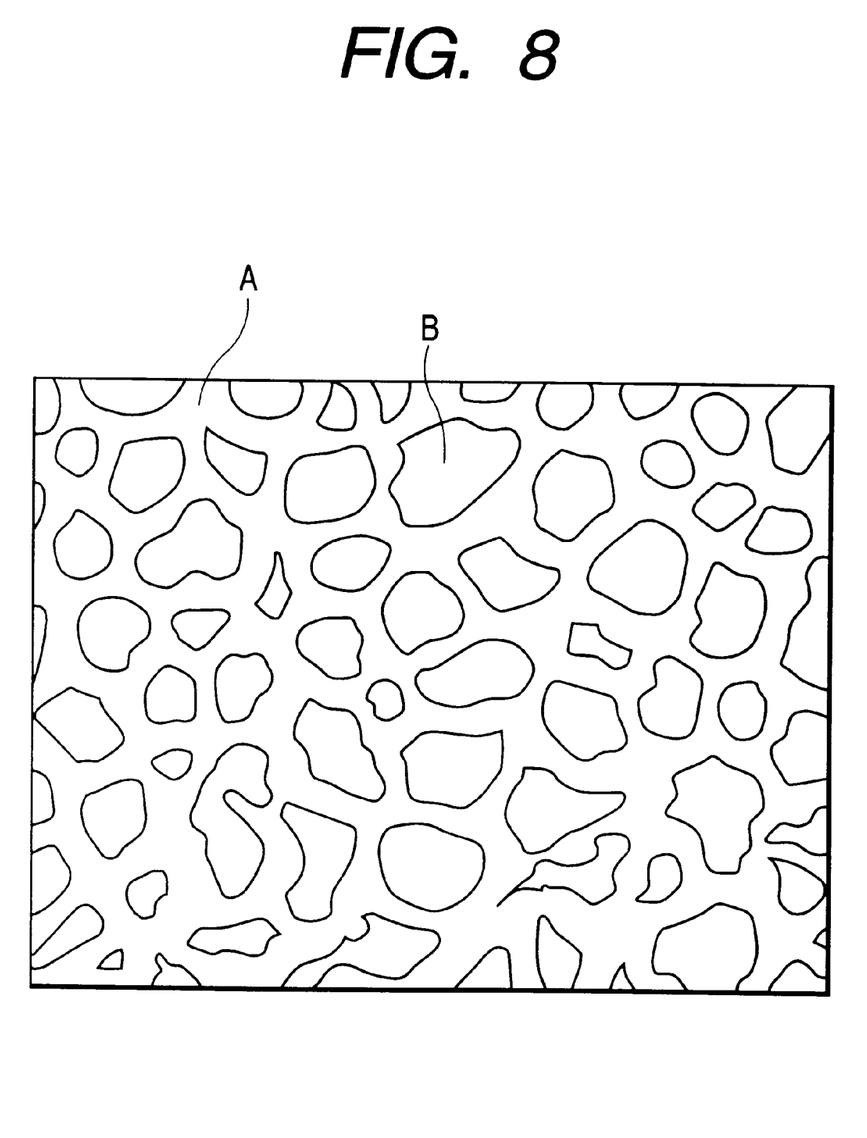
FIG. 8 is a view schematically showing an example of a cross-sectional structure of a liquid crystal layer used in a liquid crystal display apparatus according to the present invention.

FIG. 8 shows a cross-section of a liquid crystal layer used in a liquid crystal display apparatus according to the present invention. In the figure, references A and B respectively denote a polymer material portion and a liquid crystal material portion. A pre-polymer material forms a mesh-like network structure shown in FIG. 8 through photopolymerization. The average hole diameter of a mesh formed by the polymer material is small in a UV-ray-irradiated area obtained by the first step, the average hole diameter of a mesh is relatively large in the other area than the UV-ray-irradiated area.

The present invention includes an embodiment of performing UV-ray irradiation adopting different irradiation intensities in first and second steps, respectively. In this manner, network forming process and residual monomer removing process can be controlled independently when forming polymer network liquid crystal, and therefore, the characteristics of polymer network liquid crystal can be totally optimized.

According to the present invention, it is possible to obtain liquid crystal characteristics of a high response speed and low hysteresis without deteriorating the contrast ratio. Therefore, total image quality can be improved for a display apparatus.

[Embodiment 1]

(1: Constitution of Liquid Crystal Display Apparatus)

Figure 1A:
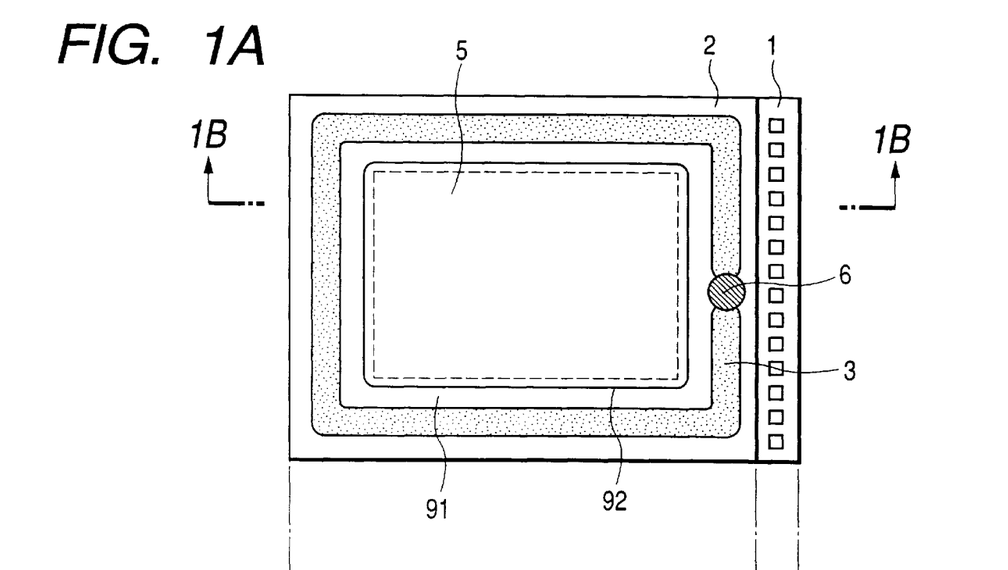
FIGS. 1A and 1B are plan and cross-sectional views showing an example of a liquid crystal display apparatus according to the present invention.
Figure 1B:
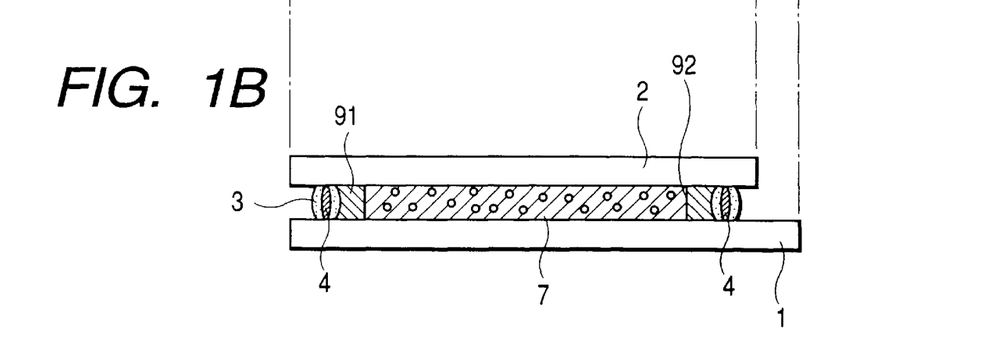

A liquid crystal panel according to a first embodiment of the present invention will be explained with reference to FIGS. 1A and 1B. In FIGS. 1A and 1B, reference 1 denotes an active matrix substrate having a reflective electrode on its surface, prepared by a semiconductor process. The reflective electrode of the active matrix substrate preferably has high flatness and a high reflectance with respect to visible light. For example, the present embodiment uses aluminum or aluminum containing a slight amount (about 0.5 to 3.0%) of another element (such as silicon, copper, titanium or the like), as an electrode material. Since the substrate surface in contact with a liquid crystal layer is almost perfectly flattened, unevenness in display characteristics caused by a variation of the thickness of liquid crystal layer and uneven injection of liquid crystal caused by a gap can be eliminated advantageously. A drain portion of a switching element is connected to each of pixel electrodes in active matrix substrate 1. As for switching elements, a MIM switch as a two-terminal device, a diode switch, a thin-film transistor of a three-terminal type, a mono-crystal silicon transistor using bulk silicon are preferred. As a thin-film transistor, an amorphous silicon transistor, a polysilicon transistor, and a SOI (Silicon On Insulator) mono-crystal transistor are known. The present embodiment can be realized with use of any of the switching elements described above. In the present embodiment, a mono-crystal silicon transistor using bulk silicon was adopted to constitute a switching element.

In addition, a light shielding layer (made of, for example, titanium) for shielding an incident light is provided between the switching element and the reflective electrode, and prevents the element from causing an operating error.

The active matrix substrate described above internally comprises on-chip drive circuits including horizontal and vertical shift registers and the like, and realizes high-speed signal processing which coops with many pixels and high precision, at low costs.

Although the present embodiment adopts an active matrix substrate of a reflective type, the present invention is applicable to an active matrix substrate of a transmissible type with the same advantages as described above.

Next, reference 2 denotes opposite glass. The glass preferably has a thickness of about 0.5 mm to 3.0 mm, high flatness, and a thermal expansion characteristic similar to that of the active matrix substrate. For example, the present embodiment used non-alkaline glass having a thickness of 1.0 mm (NH-35 available from NH TECHNO GLASS CORPORATION). In a reflection type liquid crystal panel, surface reflection from the opposite glass and interface reflection from an interface between liquid crystal and glass are factors which deteriorate contrast. As a countermeasure thereof, the present embodiment provides an anti-reflection coating on the surface and takes into consideration the film structure in the side of the interface to liquid crystal. Specifically, a transparent film (such as $MgF_2$:n=1.38) having a lower refractive index than ITO (Indium-Tin-Oxide) and glass is provided between the glass and an ITO transparent electrode having a contact with the liquid crystal surface, and the film thickness of the transparent film is selected such that minimum reflection is obtained with respect to the wavelength of incident light.

The liquid crystal panel can be used as a component of a color display apparatus of a single plate type by providing an on-chip color filter on active matrix substrate 1. In case of using the liquid crystal panel for a projection type display of a three-plate type, anti-reflection should preferably be provided in compliance with wavelengths of colors of R, G, and B.

Reference 3 denotes a main seal agent which maintains a distance in parallel between opposite glass 2 and active matrix substrate 1 and encloses liquid crystal. A thermosetting resin, a UV-curing resin, or a UV-curing/thermosetting resin and so forth can be used as a main seal agent 3. A spacer agent 4 for controlling the thickness of a polymer network liquid crystal layer is uniformly mixed in the main seal agent 3, and is uniformly applied with a pressure so that the display characteristics are uniform within the panel. A material of spacer 4 may be silica, a resin, or the like. The shape of spacer 4 may be circular or spherical and any of circular and spherical shapes can be used. In order to form a gap with high accuracy, a circular spacer made of silica was used with attention paid so as not to damage a backing layer. A seal area is formed with a proper space margin kept at the outer circumference of display area 5, so that a second area in which liquid crystal grains are large functions effectively.

Reference 6 denotes an injection port for liquid crystal. The injection port is sealed by an end seal. The end seal may be, for example, an allyl resin, a denatured epoxy resin, an epoxy-acrylate resin, or the like. Reference 91 denotes liquid crystal in the second area. Reference 92 denotes a boundary between the first and second area.

In addition, reference 7 denotes a polymer network liquid crystal layer. A polymer material may be polyacrylate, polymethacrylate, or the like. As the liquid crystal material, nematic liquid crystal, cholesteric liquid crystal, or the like may be used, and it is possible to cite a liquid crystal composite material of being biphenyl-based, phenylbenzoate-based, or phenylcyclohexane-based. In addition, the structure control may be performed by photopolymerization using a pre-mixture of three components of liquid crystal, monomer, and oligomer. The liquid crystal, for example, may be "E-8" available from BDH Inc. and having large anisotropies in dielectric constant and refractive index, the monomer may be 2-ethylhexylacrylate, and the oligomer may be urethaneacrylate oligomer.

(2: Projection Type Liquid Crystal Display Apparatus and Evaluation Apparatus)

Explanation will be conceptionally made of a system in case of evaluating a projector using a polymer network liquid crystal display apparatus as described above.

Projection display with high luminance, high resolution, and high quality can be realized by constructing a projector with three of liquid crystal panels for R, G, and B provided in an optical system.

Figure 7:
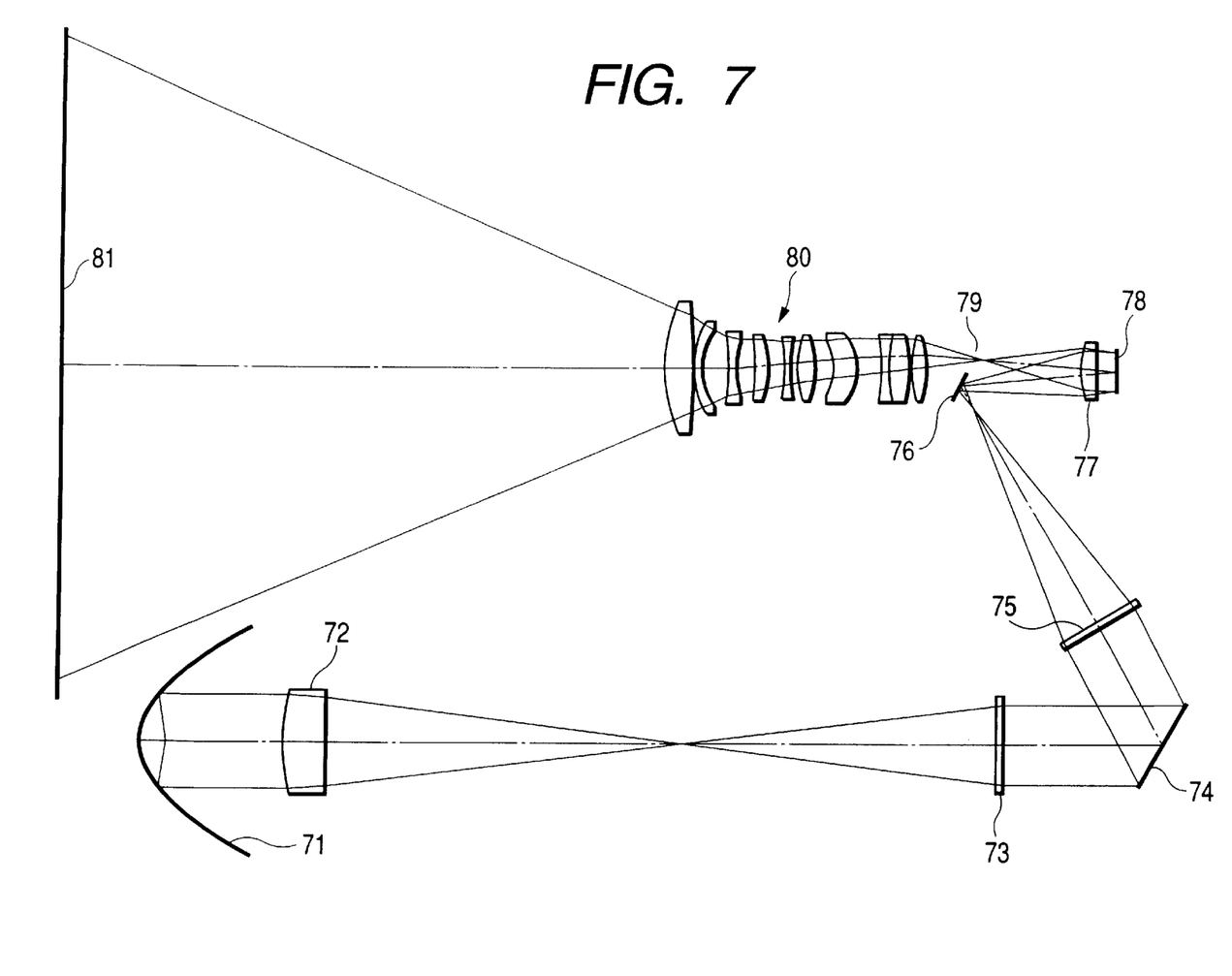
FIG. 7 is a schematic view showing a projector using a liquid crystal display apparatus according to the present invention.

In the present embodiment, a prepared liquid crystal panel was provided as a liquid crystal panel 78 in an optical system of a projection type liquid crystal display apparatus shown in FIG. 7, and the characteristics thereof were evaluated. In FIG. 7, the apparatus is comprised of a light source 71 which emits parallel light from a metal halide lamp, a xenon lamp or the like, a converging lens 72 for converging the parallel light, a Fresnel lens 73 for transferring the converged light into parallel light, a reflection mirror 74 for reflecting parallel light from the Fresnel lens 73, a Fresnel lens 75 for converging reflection light from the reflection mirror 74, a reflection mirror 76 for reflecting the converged light toward the liquid crystal panel, a view lens 77 for converting the reflection light from the reflection mirror 76 into parallel light, a liquid crystal panel 78 as a target of evaluation, and an optical system, and a screen 81 on which an image driven by the liquid crystal panel 78 is projected. The optical system comprises a projection lens for passing reflection light of liquid crystal panel 78 through a diaphragm 79 via the view lens 77 to converge and enlarge the reflection light, and a color separation mirror.

The parallel light projection optical system of the liquid crystal panel has a F-value of 8.0. Light emitted from light source 71 is modulated and reflected by liquid crystal panel 78 and is magnified by projection lens 80, to be projected onto screen 81. Although evaluation was carried out with use of a metal halide lamp of 250 (W) as light source 71, a projection type display apparatus is naturally capable of using a high-pressure mercury lamp or a xenon lamp. In addition, the output power is not limited to the above value. The evaluation was carried out with of a G-channel and the center wavelength thereof is 550(nm), as long as special notes are added.

In case of constructing a projection type display apparatus using three plates of R, G and B, light from the light source is subjected to color separation by a dichroic mirror, and liquid crystal panels corresponding to the colors may be arranged spatially such that the colors are layered on screen 81. In this case, even if three liquid crystal panels for R, G and B are used, the light source system including the light source, the converging lenses and the like, the optical system including projection lenses and the like and the screen are used in common so that a liquid crystal display apparatus of full-surface projection type can be formed with a small size, or a liquid crystal display apparatus of a back-surface projection type can be formed as a thin type even including a large size reflection mirror to the screen.

(3: Method of Manufacturing Liquid Crystal Panel)

In the following, a method of manufacturing a liquid crystal panel will be explained.

An active matrix substrate 1 cut out for every panel and an opposite glass member 2 corresponding to the substrate were prepared, and both were washed in a clean environment so that foreign materials might not be mixed therein. Ultrapure water applied with a surfactant and subjected to $CO_2$ bubbling, or ultrapure water with an ultrasonic wave applied was effective for washing. Since the surface of a reflection electrode is easily affected by chemical solutions, a very thin protect film may previously be formed on the surface in several cases. In case of aluminum, it is effective to previously form a natural oxide film on the surface by any method.

After rinsing sufficiently with ultrapure water, sufficient drying was carried out after paper drying of IPA.

Next, a main seal agent mixed with a spacer agent was coated in a desired shape on active matrix substrate 1. The main seal agent used was Worldlock 706 available from KYORITSU-KAGAKU-SANGYO Inc. which is of a UV-curing/thermosetting type applicable to both UV-curing and thermal hardening. Although a possible thickness of a liquid crystal layer is 5 $\mu$m to 20 $\mu$m, the present embodiment adopts a thickness of 13 $\mu$m. Therefore, a spacer agent for 13 $\mu$m was used.

A silver paste was coated on a predetermined position in order to attain a conductivity between active matrix substrate 1 and the ITO transparent electrode on the surface of opposite glass member 2.

Next, active matrix substrate 1 and opposite glass member 2 were adhered on each other by an adhering device. When adhering both together, a pressure was applied in a substantially parallel direction with respect to the substrate, and the substrate and the member are uniformly pressed so that the diameter of the spacer agent is substantially equal to the thickness of liquid crystal in the front surface side of the panel.

In case of the main seal agent used in the present embodiment, an irradiation with UV rays are carried out in this stage, and further, a heat treatment at 120° C. is carried out as a after-cure for 60 minutes, to finish the hardening of the main seal agent. In case of a UV-hardening type, UV rays are irradiated in this stage, to harden the main seal agent. Particularly, in case of thermosetting type, the thickness of a gap is easily changed due to shrinkage and expansion during the thermosetting. As a countermeasure thereof, it is effective to perform a heat treatment while appropriately pressing the panel. In addition, in order to effectively remove gasses and volatile components contained in the main seal agent, it is advantageous to carry out evacuation for degassing after the hardening.

(4: Liquid Crystal Injection Step)

Liquid crystal injection is carried out for the cell already subjected to adhering as described above. Liquid crystal injection is carried out as follows. A cell and a syringe containing and a liquid-crystal/prepolymer-mixture composite material are set in a liquid crystal injection device, and the liquid crystal/prepolymer-mixture composite material is dipped through an injection port for injecting the material, which is provided in the cell. The liquid-crystal/prepolymer-mixture composite material means a solution in which liquid crystal material components and prepolymer components are mixed. The solution should preferably be uniform.

In the following, the liquid crystal injection step will be explained in details. The liquid crystal injection device is comprised of a degassing chamber for performing degassing with respect to the liquid-crystal/prepolymer-mixture composite material, and a cell chamber for performing high-vacuum exhaustion of the inside of the cell and liquid crystal injection. At first, the liquid-crystal/prepolymer-mixture composite material is heated for 30 minutes in an oven previously heated to about 50° C. and is then stirred for one minute, to make a uniform phase. Thereafter, the liquid-crystal/prepolymer-mixture composite material is filled in the syringe for injecting the liquid-crystal/prepolymer-mixture composite material. The syringe filled with the liquid-crystal/prepolymer-mixture composite material is set in the degassing chamber, and subsequently, the cell is mounted on a cell holding cassette, which is set at a predetermined position in the cell chamber. The liquid crystal injection device is arranged so as to perform degassing of the liquid-crystal/prepolymer-mixture composite material, high-vacuum exhaustion inside the cell, heating of the cell, pressure control of the inside of the cell chamber and the degassing chamber, opening/closing of valves, injection of the liquid-crystal/prepolymer-mixture composite material from the syringe to the cell, and release of the cell to air after injection, as an automatic sequence.

In the liquid crystal injection step, the vacuum degree of the degassing chamber should preferably be 0.01 Torr to 10 Torr, in order that the composition of the liquid-crystal/prepolymer-mixture composite material is prevented from being changed due to differences in vaporization amounts between those components having different vaporization pressures among components of the liquid-crystal/prepolymer-mixture composite material. The present embodiment adopts 0.5 Torr. The degassing period is preferably 1 to 100 minutes, and the present embodiment adopts 10 minutes. In addition, it is effective to heat the cell in order to remove impurities in the cell and slight components generated from during vacuum exhaustion in the cell chamber. Effective heating is within a range from a room temperature to a decomposition temperature of the main seal agent, and the present embodiment adopts heating at 100° C. The vacuum degree is 10 Torr or less, and a higher effect can be obtained as the vacuum degree and the heating period increase. The present embodiment adopts 0.001 Torr and one hour. After completion of vacuum exhaustion of the cell, the pressure inside the cell chamber is decreased by introducing a slight amount of nitrogen, so that changes of the composition of the liquid-crystal/prepolymer-mixture composite material can be reduced as much as possible. In the present embodiment, the vacuum degree when injecting liquid crystal is 0.5 Torr. Further, dummy dispensing is always carried out before dripping the liquid-crystal/prepolymer-mixture composite material from the syringe into the injection port provided in the cell, so that a portion of liquid-crystal/prepolymer-mixture composite material sticking to the top end of the syringe, whose composition has changed, might not be introduced into the cell.

Injection of the liquid-crystal/prepolymer-mixture composite material was completed by 15 minutes after dripping of the liquid-crystal/prepolymer-mixture composite material into the injection port of the cell.

The present embodiment shows an example of a method of dripping liquid-crystal/prepolymer-mixture composite material into an injection port of the cell, as a method of liquid crystal injection. However, the other methods were attempted, by a method in which a container containing the liquid-crystal/prepolymer-mixture composite material was brought into contact with the injection port of the cell in the cell chamber, a method in which the liquid-crystal/prepolymer-mixture composite material was dripped into the injection port under a normal pressure, and a method in which a container containing the liquid-crystal/prepolymer-mixture composite material was brought into contact with the injection port of the cell under a normal pressure. In any of these methods, injection was confirmed to be completed properly.

During the liquid crystal injection step and until UV-ray irradiation is carried out in a UV-ray irradiation step as a post step, attention should be paid so that the temperature of the liquid-crystal/prepolymer-mixture composite material and the cell might not decrease to the phase separation temperature of the liquid-crystal/prepolymer-mixture composite material. If the temperature of the material and the cell decreases to be the phase separation temperature or lower, a polymer network structure to be formed later cannot be constructed properly, resulting in a factor which deteriorates display characteristics.

Further, until UV-irradiation onto the cell surface is performed as described later after injection of the liquid crystal, it is necessary to remove factors, as much as possible, which promotes a polymerization reaction with respect to the liquid-crystal/prepolymer-mixture composite material, e.g., irradiation of UV rays, an increase of temperature, and elapse of time.

After completion of cleaning of foreign materials and portions of the liquid-crystal/prepolymer-mixture composite material sticking to the cell surface, UV-irradiation is carried out onto the cell surface. The UV-irradiation onto the cell surface is carried out to polymerize prepolymer components and simultaneously promote phase separation between the liquid crystal components and the prepolymer components, by irradiating the liquid-crystal/prepolymer-mixture composite material injected in the cell with UV rays within a sensitive wavelength range to form a polymer network made of a UV-hardening resin inside the cell.

(5: Light Irradiation Step)

Figure 2:
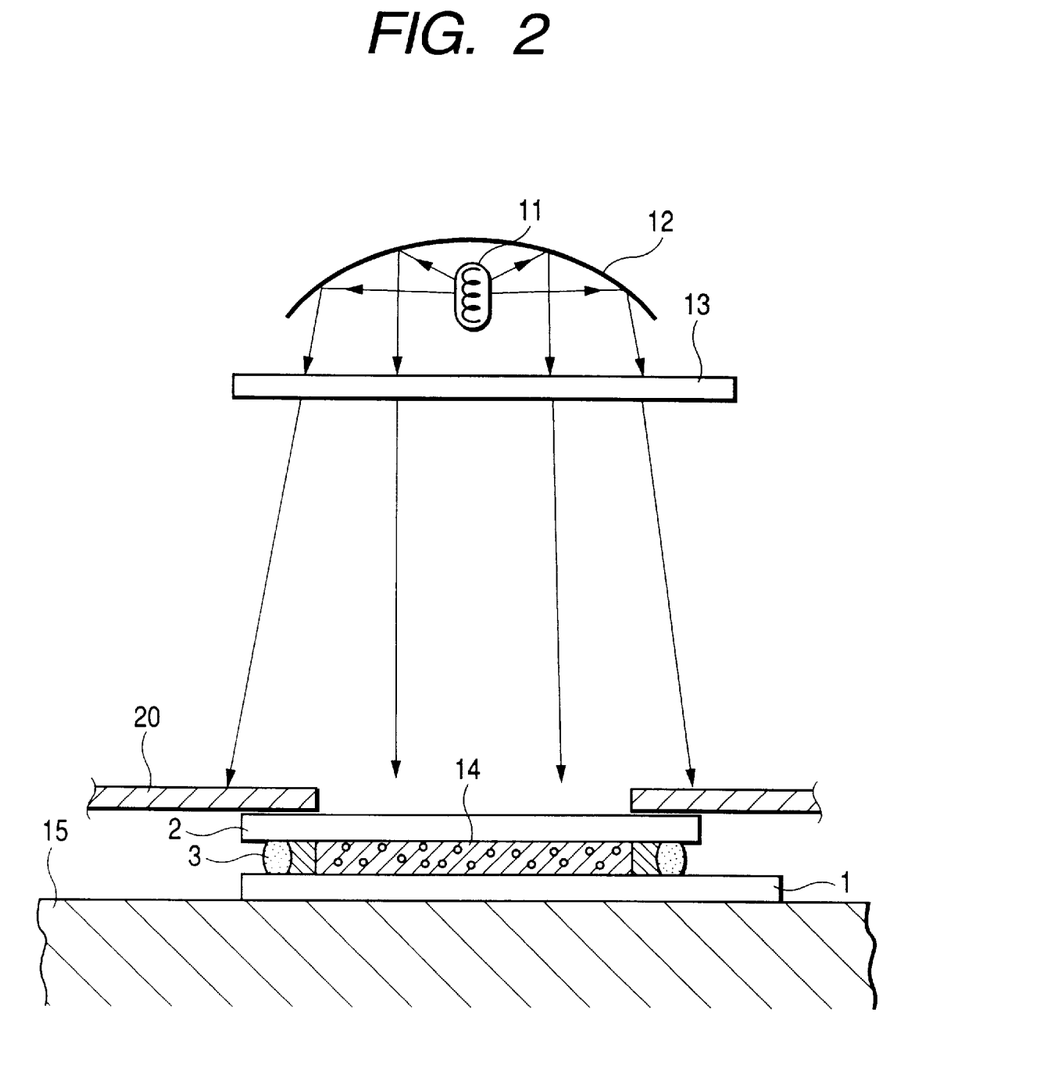
FIG. 2 is a schematic view for explaining steps of manufacturing a liquid crystal display apparatus according to the present invention.

The UV-irradiation onto the liquid crystal panel as described above will be explained below with reference to FIG. 2. In FIG. 2, UV rays are emitted from a light emission tube 11 and a parabolic mirror 12 is provided behind the tube 11 so that parallel light is emitted. The liquid crystal panel is irradiated with the light through a short-wave cut filter 13. Reference 1 denotes an active matrix substrate. Reference 15 denotes a temperature adjust stage.

In first irradiation, a light shielding member 20 is provided on glass member 2, and a light shielding frame thereof is set so as to be hindered inside a seal material 3. The first irradiation is carried out with a strong light intensity for a short time period. Next, in second irradiation, shielding member 20 is removed, and irradiation is carried out with a weak light intensity for a long time. The strong and weak light intensities can be obtained by adjusting the height of the power source voltage, or by providing a light reducing filter between the light emission tube 11 and the liquid crystal panel.

The UV-irradiation device used in the present embodiment adopts an ultra-high-voltage mercury lamp of 4 kW as a light source. The UV-irradiation device comprises an optical filter for cutting UV rays having a short wavelength of 350 nm or less, in order to prevent decomposition of the liquid-crystal/prepolymer-mixture composite material 14 and components of a polymer network structure to be formed after the UV-irradiation.

The cell temperature during the UV-irradiation was set to 19.0 °C. The temperature of the cell was controlled by providing a thermal chuck (TC2800 available from TRIO-TECH), and the cell temperature was monitored by causing a thermocouple to have a direct contact on the thermal chuck. The temperature of the thermal chuck achieved a time-based stability of ±0.2° C.

In order to selectively irradiate UV rays at a desired position on the cell surface, a light shielding frame for UV rays was prepared. A steel plate having a thickness of 0.3 mm and a surface galvanized with black zinc was used as a material of the light shielding frame, and an opening portion was formed at the UV-irradiation area. After the light shielding frame was fitted and fixed to the cell surface, the cell was set on the thermal chuck in the UV-irradiation device, and then, UV-irradiation was carried out.

Once the cell surface was subjected to UV-irradiation, liquid crystal material caused phase separation and polymerization in a few seconds, and the color of the inside of the cell which was transparent before the UV-irradiation turned into milk-white due to a polymer network structure formed by the UV-irradiation. Subsequently, the light shielding frame was taken off from the cell surface, and continuously, UV-irradiation of in the second step was carried out with the irradiation time period changed.

In UV-irradiation onto the cell surface, prepolymer components are polymerized by irradiating UV rays of a sensitive wavelength range onto the liquid-crystal/prepolymer-mixture composite material injected in the cell. At the same time, phase separation between the liquid crystal components and the prepolymer components, thereby to form a polymer network structure made of a UV-hardening resin in the cell.

Parameters relating to the UV-irradiation are a UV-irradiation method (such as single step irradiation or two-step irradiation), a wavelength of UV rays, UV-irradiation, a UV-irradiation period, a UV-irradiation cell temperature, and a shelf period and a shelf environment between the irradiation of the first step and that of the second step in case of two-step irradiation.

In the present embodiment, the UV-irradiation method, UV-irradiation intensity, and the UV-irradiation period were discussed as parameters for UV-irradiation.

Specifically, liquid crystal panels were manufactured on the following conditions. For making comparison, two kinds of panels were manufactured, one kind using only one step described above and the other kind using two steps according to the present embodiment.

(i) Irradiation in one step:
Irradiation intensity: 20 to 150 mW/cm$^2$
Irradiation period: 0.5 to 120 seconds
(ii) Irradiation in two steps of first and second:
First step
Irradiation intensity: 20 to 150 mW/cm$^2$
Irradiation period: 0.5 to 120 seconds
Second step
Irradiation intensity: 1 to 20 mW/cm$^2$
Irradiation period: 50 to 3000 seconds The irradiation periods and the stage temperature were investigated within a range from the phase separation temperature (15 to 18° C.) to 30° C.

A range of 50 to 3000 $\mu$m was considered for the width of the transmissible area of the shielding member 20 as a second liquid crystal area and the seal frame. The present embodiment due to the processing accuracy of the light shielding member 20 and stray light during irradiation, the boundary portion had irregularity of about 100 $\mu$m. On these conditions, improvements of color unevenness can be efficiently achieved if the second liquid crystal area is 200 $\mu$m or more.

The liquid crystal panel thus obtained was remarkably improved in in-plane dispersion and color unevenness was reduced to an extent at which no problems are caused in practical use. In addition, the cross-section of the polymer network was observed by a scanning electron microscope, to find out the network structure schematically shown in FIG. 8 (in which references A and B respectively denote polymer and liquid crystal portions). In the first area including the display area subjected to the two-step irradiation in both the first and second steps, the average diameter of holes of a mesh of the polymer was 0.5 to 5 $\mu$m. On the other side, in the second area subjected to only the weak irradiation in the second step, the average diameter was 5 to 100 $\mu$m.

For example, when the irradiation in the first step was performed at 40 mW/cm$^2$ for 6 seconds and the irradiation in the second step was performed at 5 mW/cm$^2$ for 430 seconds, the unevenness of luminance was reduced to ±5% or less. As for improvements of dispersion, similar effects ware found in the case of performing the irradiation in the first step at 40 mW/cm$^2$ for 60 seconds without performing irradiation in the second step. In addition, the hysteresis, response speed, and contrast were more excellent than in a conventional method.

Liquid crystal panels according to the present embodiment were optimized for R, G, and B, respectively, and were set in a projector of a three-plate type. Then, the in-plane distribution of color unevenness was improved so that the image quality was greatly improved.

(6: End Sealing of Liquid Crystal Injection Port)

End sealing was carried out for a cell subjected to UV-irradiation. An end seal agent used was an epoxy-acrylate resin of a UV-hardening type (30Y-195B available from THREE BOND Inc.). The liquid crystal injection port of the cell was coated with an end seal agent and light shielding of the liquid crystal display portion of the cell was carried out. Thereafter, the end seal agent was subjected to UV-hardening by UV-irradiation, thus completing the end sealing. Other end seal agents which could be used were a UV-hardening type aryl resin A704 available from SEKISUI FINE CHEMICAL Inc., and an agent available from KYORITSU-KAGAKU-SANGYO Inc. Next, foreign materials sticking to the cell surface were removed, and thereafter, the cell was adhered to a holder for assembly into an optical system. Further, a flexible print board was connected to the holder, and the electrode pad of the active matrix substrate was connected to the flexible print board by means of wire bonding. Thus, a liquid crystal panel was prepared.

The contrast ratio of the liquid crystal panel thus prepared will be explained below. As for the two-step irradiation, it has been found that the UV-irradiation in the first step requires a UV-irradiation intensity of at least 20 mW/cm$^2$ or more. When the irradiation intensity in the first step was set to 50 mW/cm$^2$ or more, deterioration of the contrast ratio was not found within a range up to 120 mW/cm$^2$. It is considered that this phenomenon appeared because the diffusion characteristic with respect to light of R having the longest wavelength began falling as the size of the formed polymer network became small due to an increase of the irradiation intensity in the first step.

Therefore, the upper limit of the irradiation intensity in the first step is defined by the deterioration of the diffusion characteristic caused by a decrease in size of the polymer network, and it is desirable that the irradiation intensity in the first step is substantially 150 mW/cm$^2$ or less.

(Embodiment 2)

Figure 3:
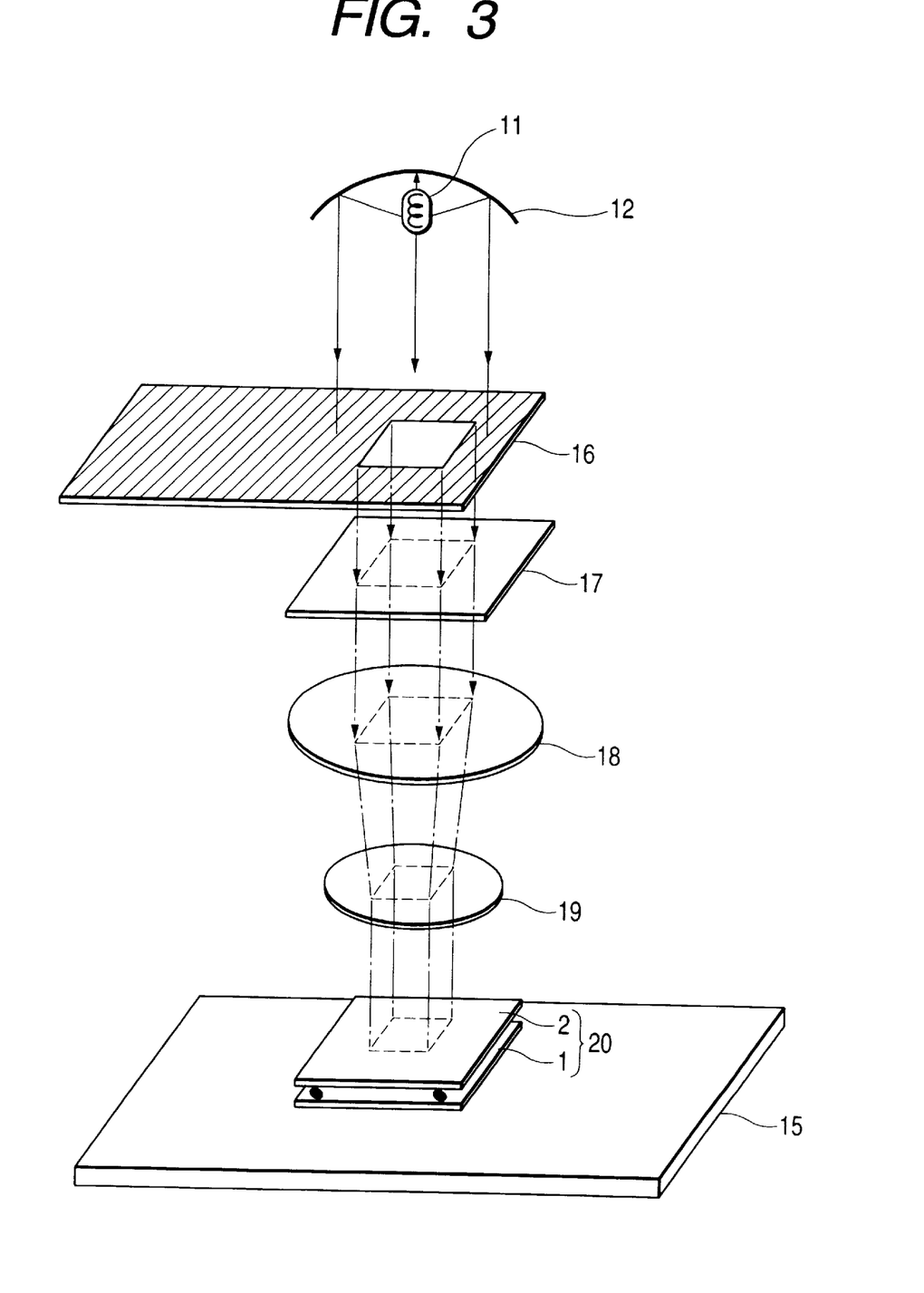
FIG. 3 is a schematic view for explaining steps of manufacturing a liquid crystal display apparatus according to the present invention.
Figure 4:
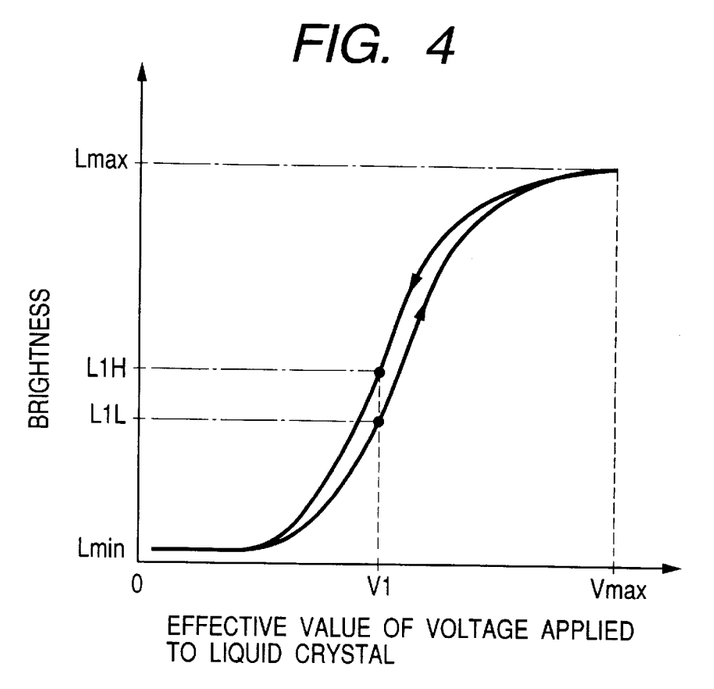
FIG. 4 is a hysteresis characteristic graph of a liquid crystal display apparatus according to the present invention.

FIG. 3 shows a schematic structure of a light irradiation device according to a second embodiment 2 of the present invention. In FIG. 3, reference 11 denotes a light source as a light emission tube such as a metal halide lamp, a halogen lamp, a xenon lamp, or the like. Reference 16 denotes a light shielding mask, and reference 20 denotes a liquid crystal panel including a glass member 2 opposed to an active matrix substrate 1. Reference 17 denotes a band-pass filter which transmits light within a wavelength range of UV rays. Reference 18 denotes a converging lens for converging light into a direction toward the liquid crystal panel 20. Reference 19 denotes a converging lens for outputting parallel light to the liquid crystal panel 4. Reference 15 denotes a X-Y stage with a temperature adjust function.

In the present invention, like in Embodiment 1, a cell is prepared by adhering the reflective active matrix substrate 1 and glass substrate 2 on each other with a seal agent and a spacer agent inserted between the two substrates, and a liquid-crystal/prepolymer-mixture material obtained by mixing nematic liquid crystal into polyacrylate polymer at a ratio of 4:1 is injected under a normal pressure.

In the present invention, the structure adopted in the UV-irradiation is arranged as shown in FIG. 3. Specifically, light from the light source 11 having a peak at a wavelength range of 350 to 400 nm is shaped by a light shielding mask, and only components of 350 to 400 nm is transmitted by the optical (or band-pass) filter 17. Those components of light are converged to a desired size by the converging lenses 18 and 19, and are irradiated onto the liquid crystal panel 20 set on the X-Y stage 15 with a temperature adjust function.

In this system, fine adjustment of the irradiation position can be achieved by the X-Y stage, so that the second liquid crystal can be controlled accurately.

In addition, the irradiation period and the light shielding area can be changed by moving light shielding mask 16, so that irradiation in both of the two steps can be performed by one apparatus, contributing to improvements of productivity.

Conditions of UV-irradiation were set in the same range as in Embodiment 1. 50 to 5000 $\mu$m was chosen as the width of the second liquid crystal area.

In the present embodiment, improvements of unevenness were found with respect to the width of 100 $\mu$m to 3000 $\mu$m, because light entered vertically into the panel and the positional accuracy of the irradiation area was ±1 $\mu$m.

The reflection ratio versus voltage characteristic of liquid crystal panel 20 thus obtained was improved in comparison with a conventional method and display unevenness was eliminated.

Also, characteristics such as the contrast, hysteresis, and response speed were more excellent than a conventional method.

What is claimed is:

1. A liquid crystal display apparatus comprising:
   a first polymer-containing liquid crystal area forming a first area including the display area; and
   a second polymer-containing liquid crystal area including a second area other than the first area, wherein
   polymer of the first polymer-containing liquid crystal area and polymer of the second polymer-containing liquid crystal area respectively have network structures different from each other.

2. A liquid crystal display apparatus according to claim 1, wherein an averaged diameter of holes of mesh of the polymer observed by observation of cross-sections of the first polymer-containing liquid crystal area differs from an averaged diameter of holes of mesh of the polymer observed by observation of cross-sections of the second polymer-containing liquid crystal area.

3. A liquid crystal display apparatus according to claim 2, wherein the averaged diameter of the holes of the mesh of the first polymer-containing liquid crystal area is smaller than the averaged diameter of the holes of the mesh of the second polymer-containing liquid crystal area.

4. A liquid crystal display apparatus according to claim 3, wherein the averaged diameter of the holes of the mesh of the first polymer-containing liquid crystal area is within a range of 0.5 to 5 $\mu$m.

5. A liquid crystal display apparatus according to claim 3, wherein the averaged diameter of the holes of the mesh of the second polymer-containing liquid crystal area is within a range of 5 to 100 $\mu$m.

6. A liquid crystal display apparatus according to claim 1, wherein the second polymer-containing liquid crystal area has a width of 100 $\mu$m or more.

7. A liquid crystal display apparatus according to claim 6, wherein the second polymer-containing liquid crystal area has a width of 200 $\mu$m or more.

8. A liquid crystal display apparatus according to claim 1, wherein the second polymer-containing liquid crystal area is in contact with a seal portion for sealing a polymer-containing liquid crystal.

9. A liquid crystal display apparatus according to claim 8, wherein the first polymer-containing liquid crystal area is not in contact with the seal portion and is positioned inside the second polymer-containing liquid crystal area.

10. A method of manufacturing a liquid crystal display apparatus according to any one of claims 1–9, comprising:
    a step of providing a liquid crystal material and a prepolymer material between a pair of substrates at least one of which is transparent; and a step of irradiating the pre-polymer with light which causes the pre-polymer material to make a polymerization reaction, to polymerize the pre-polymer material, wherein first light irradiation is performed on a first area including a display area, and thereafter, second light irradiation is performed on the first area and a second area other than the first area.

11. A method of manufacturing a liquid crystal display apparatus according to claim 10, wherein the first area is located inside a seal area for sealing the liquid crystal material.

12. A method of manufacturing a liquid crystal display apparatus according to claim 11, wherein the second area includes the seal area.

13. A method of manufacturing a liquid crystal display apparatus according to claim 10, wherein the first light irradiation and the second light irradiation are performed with use of ultraviolet rays.

14. A method of manufacturing a liquid crystal display apparatus according to claim 13, wherein the first light irradiation is performed with a higher irradiation intensity than the second light irradiation.

15. A method of manufacturing a liquid crystal display apparatus according to claim 14, wherein the first light irradiation is performed with an irradiation intensity of 20 to 15 mW/cm$^2$ and the second light irradiation is performed with an irradiation intensity of 1 to 20 mW/cm$^2$.

16. A method of manufacturing a liquid crystal display apparatus according to claim 13, wherein the first light irradiation is performed for a shorter irradiation period than the second light irradiation.

17. A method of manufacturing a liquid crystal display apparatus according to claim 16, wherein the first light irradiation is performed for 0.5 to 120 seconds and the second light irradiation is performed for 50 to 3000 seconds.

18. A liquid crystal projector for irradiating the liquid crystal display apparatus according to claim 1 with light from a light source, and for projecting reflection light from the liquid crystal display apparatus onto a screen, to display an image.

* * * * *

UNITED STATES PATENT AND TRADEMARK OFFICE
CERTIFICATE OF CORRECTION

PATENT NO. : 6,175,397 B1
DATED : January 16, 2001
INVENTOR(S) : Shunsuke Inoue et al.

It is certified that error appears in the above-identified patent and that said Letters Patent is hereby corrected as shown below:

Column 1,
Line 41, "crystal," should read -- crystals, --; and
Line 56, "indexes" should read -- index --.

Column 2,
Line 27, "crystal," should read -- crystals--; and
Line 31, "(polymer" should read -- "polymer --.

Column 4,
Line 37, "effected." should read -- affected. --.

Column 6,
Line 37, "coops" should read -- copes --.

Column 7,
Line 41, "urethaneacrylate" should read -- urethane-acrylate --; and
Line 49, "of" should be deleted.

Column 8,
Line 15, "with of a G-channel and" should read -- using a G-channel, --;
Line 16, "550(nm), as long as special" should read -- 550(nm). --; and
Line 17, "notes are added." should be deleted.

Column 9,
Line 7, "a" should read -- an --;
Line 22, "and" should be deleted; and
Line 31, "details." should read -- detail. --.

Column 10,
Line 54, "promotes" should read -- promote --.

Column 11,
Line 14, "so as to be hindered" should be deleted; and
Line 54, "of in" should read -- of --.

Column 12,
Line 55, "ware" should read -- were --.

UNITED STATES PATENT AND TRADEMARK OFFICE
CERTIFICATE OF CORRECTION

PATENT NO.   : 6,175,397 B1
DATED        : January 16, 2001
INVENTOR(S)  : Shunsuke Inoue et al.

It is certified that error appears in the above-identified patent and that said Letters Patent is hereby corrected as shown below:

Column 13,
Line 47, "panel 4." should read -- panel 20. --; and "a" should read -- an --; and
Line 60, "is" should read -- are --.

Column 16,
Line 5, "15 mW/cm$^2$" should read -- 150 mW/cm$^2$ --.

Signed and Sealed this

Fourth Day of December, 2001

Attest:

*Nicholas P. Godici*

NICHOLAS P. GODICI
*Attesting Officer*     *Acting Director of the United States Patent and Trademark Office*